US008999515B2

(12) United States Patent
Horibata et al.

(10) Patent No.: US 8,999,515 B2
(45) Date of Patent: Apr. 7, 2015

(54) PROTECTION WELDING STRUCTURE

(75) Inventors: Shinichi Horibata, Yokohama (JP); Ken Imai, Yokohama (JP); Hiroaki Taga, Yokohama (JP); Tomio Matsufuji, Yokohama (JP); Shin Maezawa, Yokohama (JP); Hideki Kobayashi, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 245 days.

(21) Appl. No.: 13/449,648

(22) Filed: Apr. 18, 2012

(65) Prior Publication Data
US 2012/0270062 A1 Oct. 25, 2012

(30) Foreign Application Priority Data
Apr. 19, 2011 (JP) .................................. 2011-093120

(51) Int. Cl.
B32B 3/06 (2006.01)
B23K 11/14 (2006.01)

(52) U.S. Cl.
CPC ........... B23K 11/14 (2013.01); B23K 2201/006 (2013.01)

(58) Field of Classification Search
None
See application file for complete search history.

(56) References Cited

U.S. PATENT DOCUMENTS

| 1,020,056 | A | | 3/1912 | Rietzel | |
|---|---|---|---|---|---|
| 3,528,163 | A | * | 9/1970 | Brown et al. | 228/141.1 |
| 3,633,312 | A | * | 1/1972 | Yeager et al. | 49/503 |
| 4,168,795 | A | * | 9/1979 | Bennett | 228/175 |
| 4,461,943 | A | | 7/1984 | Beauvais | |
| 4,488,334 | A | * | 12/1984 | Goforth | 24/277 |
| 6,188,039 | B1 | * | 2/2001 | Gass | 219/104 |
| 6,455,801 | B1 | * | 9/2002 | Bramervaer | 219/93 |
| 2005/0279488 | A1 | * | 12/2005 | Stillman et al. | 165/177 |
| 2012/0270061 | A1 | * | 10/2012 | Nakane et al. | 428/594 |

FOREIGN PATENT DOCUMENTS

| EP | 0102927 | 3/1984 |
|---|---|---|
| JP | 59-215284 | 12/1984 |
| JP | 01-309789 | 12/1989 |
| JP | 9-57462 | 3/1997 |

OTHER PUBLICATIONS

Machine translation of EP102927. Mar. 1984.*
Extended Search Report issued Aug. 8, 2012 in corresponding European Application No. 12164399.3.
Office Action mailed Mar. 11, 2014 in corresponding Japanese Patent Application No. 2011-093120.

* cited by examiner

*Primary Examiner* — John J Zimmerman
(74) *Attorney, Agent, or Firm* — Knobbe Martens Olson & Bear LLP

(57) ABSTRACT

A projection welding structure including plural projection portions that are provided to an end face at an open side end portion of a reinforcement member flange portion and are disposed at intervals along the length direction of the reinforcement member. The plural projection portions are each abutted and welded to welding projections formed in a surface of a panel frame. Contact between the welding member and the welded member is suppressed at locations other than at the welding projections by such a structure.

6 Claims, 6 Drawing Sheets

PROTECTION WELDING STRUCTURE

CROSS-REFERENCE TO RELATED APPLICATION

This application claims priority under 35 USC 119 from Japanese Patent Application No. 2011-093120, filed on Apr. 19, 2011, the disclosure of which is incorporated by reference herein.

BACKGROUND OF THE INVENTION

1. Field of the Invention

The present invention relates to a projection welding structure.

2. Description of the Related Art

Projection welding is known for welding a welded member to welding projections (projections) formed as welding portions to a welding member (base member) by passing current through the welding projections whilst pressing the welded member onto the welding projections (for example, Japanese Patent Laid-Open (JP-A) No. 9-57462). In the technology described in JP-A No. 9-57462 a plate shaped welding member formed with plural welding projections is superimposed on and projection welded to a plate shaped welded member. A support face of an electrode that supports the welded member is formed with plural recessed portions each corresponding to the respective welding projections, and locations of the welded member pressed by the welding projections are capable of elastic deformation (for example bowing) into the recessed portions. Tolerance (variation) between heights of the respective welding projections is accordingly accommodated, and electrical current is suppressed from being concentrated on particular welding projections.

However, there is a possibility of the welding face of the welding member making contact with the welding face of the welded member at locations other than the welding projections prior to completing welding of the welded member to the welding projections, for example as a result of manufacturing errors in for example the welding face of the welding member or the welded member, or the support faces of electrodes. The electrical current splits at contact locations other than the welding projections in such cases, causing poor welding due to a decrease in the amount of current flowing in the welding projections.

SUMMARY OF THE INVENTION

In consideration of the above circumstances, the present invention provides a projection welding structure in which contact between the welding member and the welded member is suppressed at locations other than the welding projections.

A projection welding structure of a first aspect of the present invention includes: a first plate member with plural welding projections formed on a surface of the first plate member; a second plate member disposed with an end face of the second plate member facing the surface of the first plate member; and plural projection portions provided at locations on the end face of the second plate member facing towards the respective welding projections, projecting out from the end face and abutting and welded to the welding projections.

According to a projection welding structure of the first aspect, the plural projection portions projecting from the end face of the second plate member are respectively abutted and welded to the plural welding projections formed to the surface of the first plate member. A separation corresponding to the height of the projection portions is secured between the end face of the second plate member and the surface of the first plate member by employing the projection portions as a weld overlap (weld margin).

Contact between the surface of the first plate member and the end face of the second plate member at locations other than the welding projections is suppressed since unevenness or distortion due to manufacturing tolerance on the surface of the first plate member or the end face of the second plate member is accommodated by the separation between the surface of the first plate member and the end face of the second plate member. A specific amount of current thereby flows in the contact portions (welding portions) of the welding projections and the projection portions since current is suppressed from splitting at locations other than the contact portions of the projection portions and the welding projections. The weld quality is consequently raised due to the contact portions between the welding projections and the projection portions being heated to a specific temperature.

The cost of manufacturing the first plate member and the second plate member can also be reduced since the flatness precision required for the surface of the first plate member and the end face of the second plate member is relaxed.

A projection welding structure of a second aspect of the present invention is a projection welding structure of the first aspect in which, as viewed along the second plate member plate thickness direction, the width of leading end faces of the projection portions is wider than the width of the welding projections.

According to a projection welding structure of the second aspect, it is possible to accommodate positional misalignment in the width direction of the projection portions when positioning the projection portions on the welding projections, due to the width of the projection portions being wider than the width of the welding projections as viewed along the second plate member thickness direction. Namely an increase in productivity and cost saving can be achieved since the precision required for positioning the projection portions with respect to the welding projections is relaxed.

A projection welding structure of a third aspect of the present invention is a projection welding structure of the first aspect or the second aspect, in which, as viewed along the second plate member plate thickness direction, angles formed between side edges of the projection portions and the end face of the second plate member are obtuse angles.

According to a projection welding structure of the third aspect, as viewed along the second plate member thickness direction, the angles formed between the side edges of the projection portions and the end face of the second plate member are obtuse angles. During projection welding, current flows through the contact portions of the welding projections and the projection portions while the projection portions of the second plate member are being pressed against the welding projections of the first plate member. If the projection portions distort or buckle due to the pressing force when this is being carried out, there is a possibility that the second plate member may tilt relative to the first plate member, leading to the surface of the first plate member and the end face of the second plate member making contact at locations other than at the contact portions between the welding projections and the projection portions.

As a countermeasure thereto, in the present invention the angles formed between the end face of the second plate member and the side edges of the projection portions are obtuse angles. The rigidity of the projection portions to the pressing force described above is accordingly raised in comparison to cases in which the angles between the end face of the second plate member and the side edges of the projection portions are right angles or acute angles. Contact between the surface of the first plate member and the end face of the second plate member is accordingly suppressed at locations other than the contact portions between the welding projections and the projection portions due to suppressing distortion or buckling of the projection portions.

A projection welding structure of a fourth aspect of the present invention is the projection welding structure of any one of the first aspect to the third aspect in which, as viewed along the second plate member plate thickness direction, the projection portions are formed with a substantially trapezoidal shape projecting out as a protrusion from the end face of the second plate member.

According to a projection welding structure of the fourth aspect, the rigidity of the projection portions is increased due to the shape of the projection portions being formed with a substantially trapezoidal shape projecting out as a protrusion from the end face of the second plate member, as viewed along the second plate member thickness direction. Contact between the surface of the first plate member and the end face of the second plate member at locations other than the contact portions between the welding projections and the projection portions is accordingly suppressed due to suppressing distortion or buckling of the projection portions when the projection portions are being pressed against the welding projections.

A projection welding structure of a fifth aspect of the present invention is the projection welding structure of any one of the first aspect to the fourth aspect, in which the welding projections extend in a direction intersecting with the length direction of the second plate member, and the projection portions are welded to a length direction intermediate portion of the welding projections.

According to a projection welding structure of the fifth aspect, positional misalignment in the length direction of the welding projections can be accommodated when positioning the projection portions of the second plate member on the welding projections, due to the welding projections extending in a direction intersecting with the second plate member. Namely, an increase in productivity and a cost saving can be achieved since the precision required for positioning the projection portions with respect to the welding projections is relaxed.

A projection welding structure of a sixth aspect of the present invention is the projection welding structure of any one of the first aspect to the fifth aspect, in which the first plate member is a panel frame configuring a vehicle seat back.

According to a projection welding structure of the sixth aspect of the present invention, welding projections are formed to the surface of a panel frame serving as a first plate member configuring a vehicle seat back as the first plate member, and the end face of the second plate member is abutted and welded to the welding projections. An increase in productivity and a cost saving can accordingly be achieved for vehicle seat backs.

According to a projection welding structure according to the present invention as explained above, contact between the first plate member and the second plate member can be suppressed at locations other than the welding projections.

BRIEF DESCRIPTION OF THE DRAWINGS

Exemplary embodiments of the present invention will be described in detail based on the following figures, wherein.

DETAILED DESCRIPTION OF THE INVENTION

Figure 1:
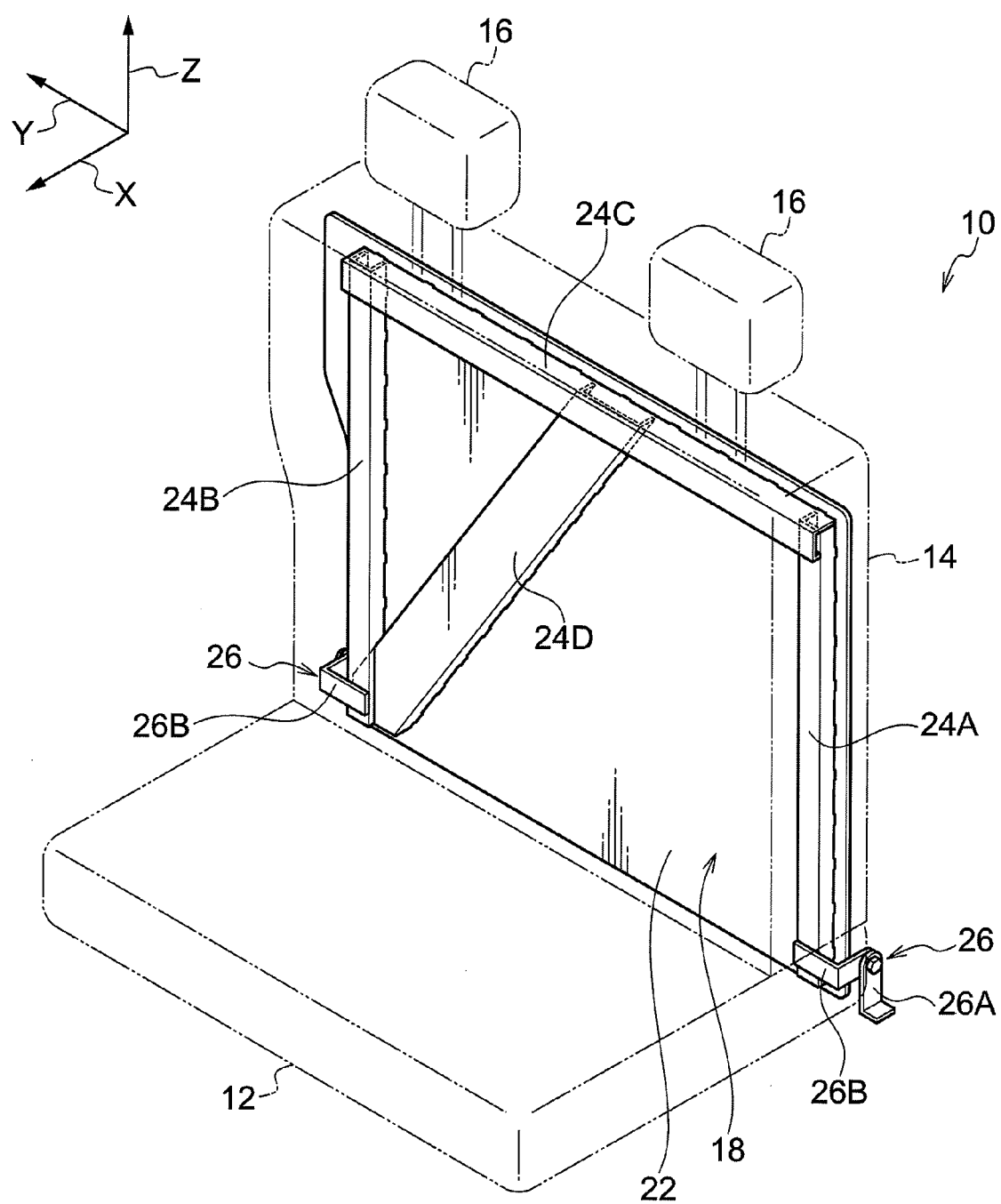
FIG. 1 is a perspective view illustrating a vehicle rear seat provided with a rear seat back frame to which a projection welding structure according to an exemplary embodiment of the present invention has been applied.

Explanation follows regarding a projection welding structure according to an exemplary embodiment of the present invention, with reference to the drawings. In the drawings arrows X, Y, Z respectively indicate a seat front-rear direction front side, a seat width direction outside, and a seat height direction top side for a vehicle rear seat equipped with a rear seat back frame applied with the projection welding structure according to the present exemplary embodiment.

Explanation follows first regarding a configuration of a vehicle rear seat 10 equipped with a rear seat back frame 18 applied with the projection welding structure according to the present exemplary embodiment.

As shown in FIG. 1, the vehicle rear seat 10 includes: a rear seat cushion 12 for supporting the posterior region and thigh regions of a seated occupant; a rear seat back 14 provided at a seat front-rear direction rear side edge portion of the rear seat cushion 12, for supporting the back of an occupant; and a headrest 16 provided at a top edge portion of the rear seat back 14 for supporting the head of an occupant. The rear seat cushion 12 is attached to the top face of a rear floor pan of the vehicle body (not shown in the drawings). The rear seat back 14 configures one side of what is referred to as a through-trunk left-right splittable tilting rear seat back, a rear seat back for two people. A rear seat back for one person, not shown in the drawings, is configured at the right hand side of the rear seat back 14 shown in FIG. 1.

The rear seat back 14 serving as the vehicle seat back is provided with the rear seat back frame 18, serving as a framework member. Cushion material is supported by the rear seat back frame 18 and covered by a sheet covering, not shown in the drawings. The rear seat back frame 18 is equipped with a panel frame 22 serving as a first plate member, and plural (four in the present exemplary embodiment) reinforcement members 24A to 24D for reinforcing the panel frame 22.

The panel frame 22 is a press component formed by press working weldable sheet metal, such as steel or iron, into a thin plate shape. A pair of rotation hinges 26 is provided at the two seat width direction edges at portions on the bottom edge of the panel frame 22, supporting the panel frame 22 so as to be rotatable in the seat front-rear direction. Each of the rotation hinges 26 is equipped with a hinge base 26A fixed to the top face of the rear floor pan of the vehicle body, not shown in the drawings, and an L-shaped hinge arm 26B hinge-coupled to the hinge base 26A. Each of the hinge arms 26B is fixed to the reinforcement members 24A, 24B, such as by welding.

The plural reinforcement members 24A to 24D are disposed on the seat front-rear direction front side of the panel frame 22. The reinforcement members 24A, 24B are disposed on the two seat width direction edges of the panel frame 22 with their length directions extending along the seat height direction, and the reinforcement member 24C is disposed at a top edge portion of the panel frame 22 with its length direction along the seat width direction. The reinforcement member 24D is disposed spanning from a bottom end portion of the reinforcement member 24B to a length direction central portion of the reinforcement member 24C. The projection welding structure according to the present exemplary embodiment is applied to the reinforcement members 24A to 24D and the panel frame 22, and each of the reinforcement members 24A to 24D is joined to a surface 22A of the panel frame 22 by projection welding (referred to below simply as welding).

Explanation follows regarding the projection welding structure according to the present exemplary embodiment, using the panel frame 22 and the reinforcement member 24A as an example.

Figure 2:
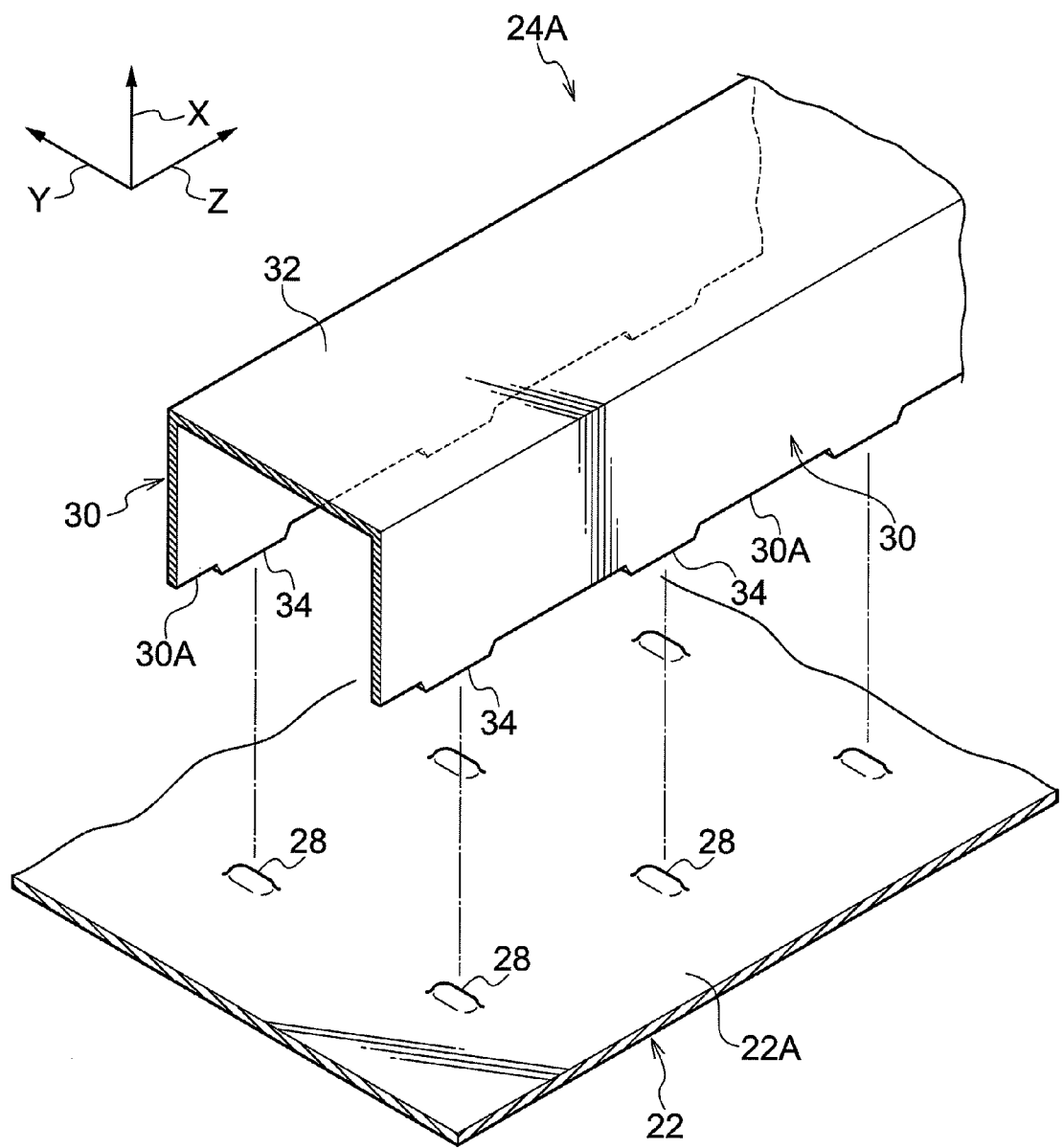
FIG. 2 is an exploded perspective view illustrating a panel frame and a reinforcement member of a projection welding structure according to an exemplary embodiment of the present invention.
Figure 3:
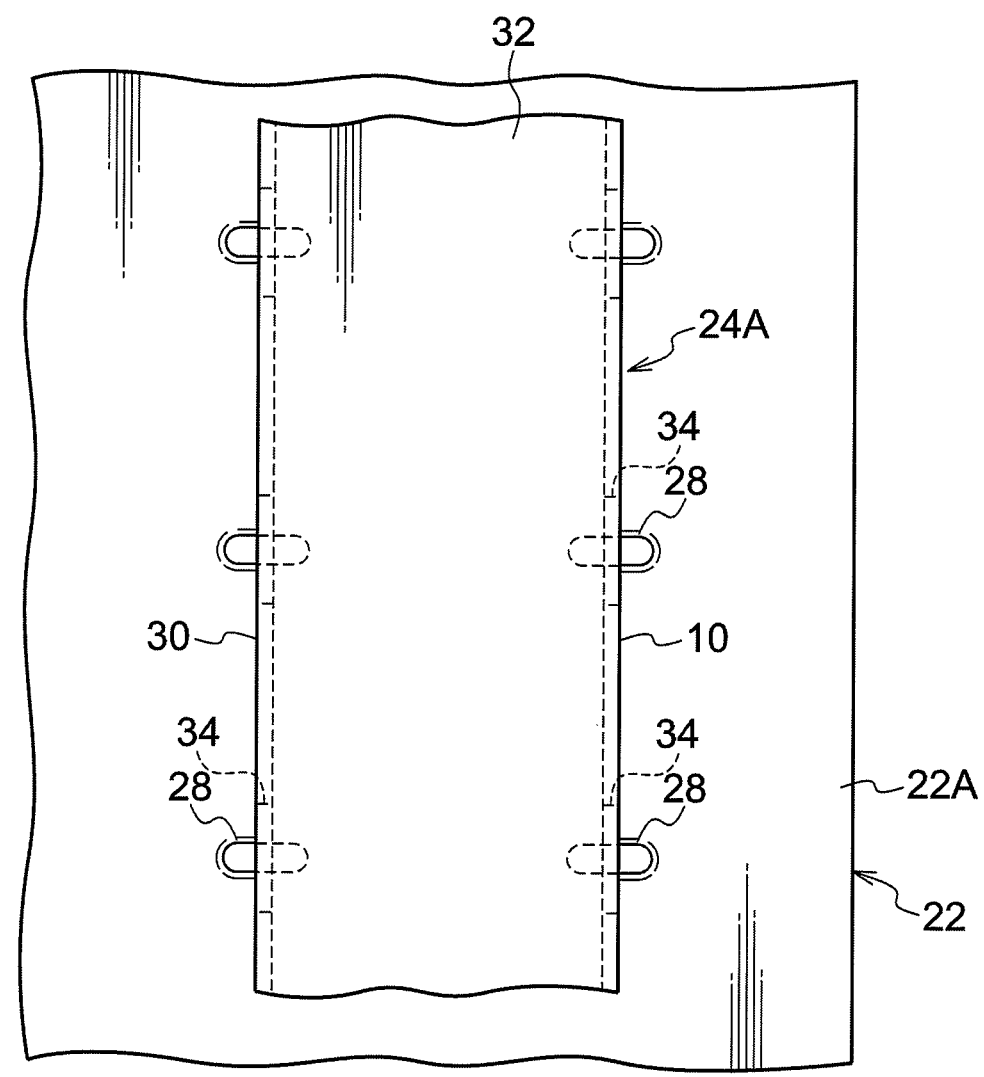
FIG. 3 is a drawing of a panel frame and a reinforcement member of a projection welding structure according to an exemplary embodiment of the present invention as viewed from the front side in the seat front-rear direction.
Figure 4A:
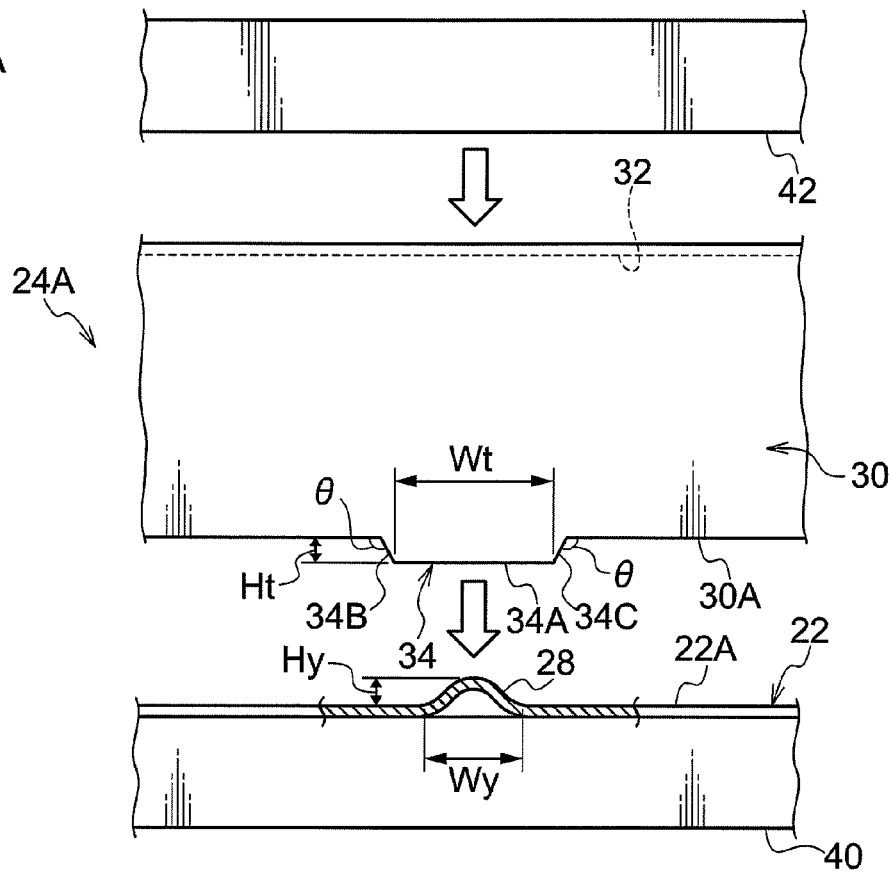
FIG. 4A and FIG. 4B are explanatory drawings explaining a projection welding method according to an exemplary embodiment of the present invention, illustrating a side view of a reinforcement member of an exemplary embodiment of the present invention.

As shown in FIG. 2, plural welding projections (projections) 28 are formed on the surface (the face on the seat front-rear direction front side) 22A of the panel frame 22 so as to project out from the surface 22A of the panel frame 22. The welding projections 28 are formed by press forming at specific intervals along the seat height direction and seat width direction. As shown in FIG. 3, each of the welding projections 28 are formed in a substantially oval shape extending in a direction (the seat width direction) that intersects (intersects orthogonally in the present exemplary embodiment) with the length direction of the reinforcement member 24A (the seat height direction) as viewed along the plate thickness direction of the panel frame 22 (the seat front-rear direction). Projection portions 34 of the reinforcement member 24A, described later, abut so as to be welded to length direction intermediate portions of each of the welding projections 28. It is accordingly possible to accommodate positional misalignment in the length direction of the welding projections 28 (positioning tolerance) when positioning the projection portions 34 on the welding projections 28. As shown in FIG. 4A, a height $H_y$ (projection amount) of the welding projections 28 is set in consideration of such factors as the plate thickness and material, at a height such that the welding projections 28 do not break when the projection portions 34 of the reinforcement member 24A abut the welding projections 28 and have been pressed and squashed.

As shown in FIG. 2, the reinforcement member 24A is a press component formed by press working a weldable metal plate material, such as steel or iron, into a C-shaped cross-section (rectangular U-channel profile). The reinforcement member 24A includes a pair of facing flange portions 30 and a web portion 32 that joins together the flange portions 30. The reinforcement member 24A is disposed with the open side of its cross-section facing towards the surface 22A of the panel frame 22, with the flange portions 30 disposed substantially perpendicular to the surface 22A of the panel frame 22. In other words, the panel frame 22 and each of the flange portions 30 are respectively disposed in substantially a T-shape, as viewed along the length direction of the reinforcement member 24A (the arrow Z direction in FIG. 2).

The plural projection portions 34 are provided to the end faces 30A on the open side edge portions of the flange portions 30 that serve as second plate members. Each of the projection portions 34 is provided on the respective end face 30A of the flange portions 30 in a location facing one of the welding projections 28. More specifically, the projection portions 34 are each formed by press forming at intervals along the length direction of the reinforcement member 24A (the seat height direction), and abutted against so as to be welded to the respective plural welding projections 28 formed to the panel frame 22.

As shown in FIG. 4A, the projection portions 34 project out in protruding shapes from the end faces 30A of the flange portions 30 and, when viewed from the flange portion 30 plate thickness direction (the seat width direction (Y axis direction) in FIG. 2), are each formed with a substantially trapezoidal shaped profile with the leading end faces 34A of the projection portions 34 as upper bases (or lower bases). As viewed along the flange portion 30 plate thickness direction, the width $W_t$ of the leading end faces 34A is wider than a width $W_y$ of the welding projections 28 formed to the panel frame 22. A width direction intermediate portion of each of the leading end faces 34A abuts against so as to be welded to the respective welding projections 28. Accordingly positional misalignment (positioning tolerance) in the projection portion 34 width direction (the length direction of the reinforcement member 24A) can be accommodated when the projection portions 34 are being positioned on the welding projections 28.

The projection portions 34 have sloping faces 34B, 34C on the side edges of the projection portions 34, rising up from the end faces 30A of the flange portions 30 and extending to the leading end faces 34A of the projection portions 34. Angles θ formed between the sloping faces 34B, 34C of the projection portions 34 and the end faces 30A of the flange portions 30 are set as obtuse angles (90°<θ<180°), as viewed along the flange portion 30 plate thickness direction. The rigidity in the height direction of the projection portions 34 is thereby secured. By employing the projection portions 34 as the weld overlap (weld margin), a separation D (see FIG. 4B) corresponding to a height $H_t$ (projection amount) of the projection portions 34 is secured between the end faces 30A of the flange portions 30 and the surface 22A of the panel frame 22 when the projection portions 34 have been welded to the welding projections 28. The height $H_t$ of the projection portions 34 is appropriately set in consideration of the sheet thickness and material of the projection portions 34 and the weld strength required to the welding projections 28.

The angle θ is not limited to being an obtuse angle, and may be configured as a right angle or an acute angle, however angle θ is preferably an obtuse angle. The angle θ may also be set as a different value for the sloping face 34B to that for the sloping face 34C. In the present exemplary embodiment an example is given with the sloping faces 34B, 34C as the side edges of the projection portions 34, however other examples of the side edges include curved faces.

Explanation follows regarding an example of a method for projection welding according to the present exemplary embodiment.

As shown in FIG. 4A, the panel frame 22 is first mounted on a lower flat plate electrode 40 with the surface 22A facing upwards. The reinforcement member 24A is then mounted above the panel frame 22 in a state in which the open side of the reinforcement member 24A faces downwards. When this is performed the reinforcement member 24A is positioned with respect to the panel frame 22 such that the projection portions 34 provided to the end faces 30A of the flange portions 30 of the reinforcement member 24A are placed above the respective plural welding projections 28 formed to the surface 22A of the panel frame 22.

Figure 4B:
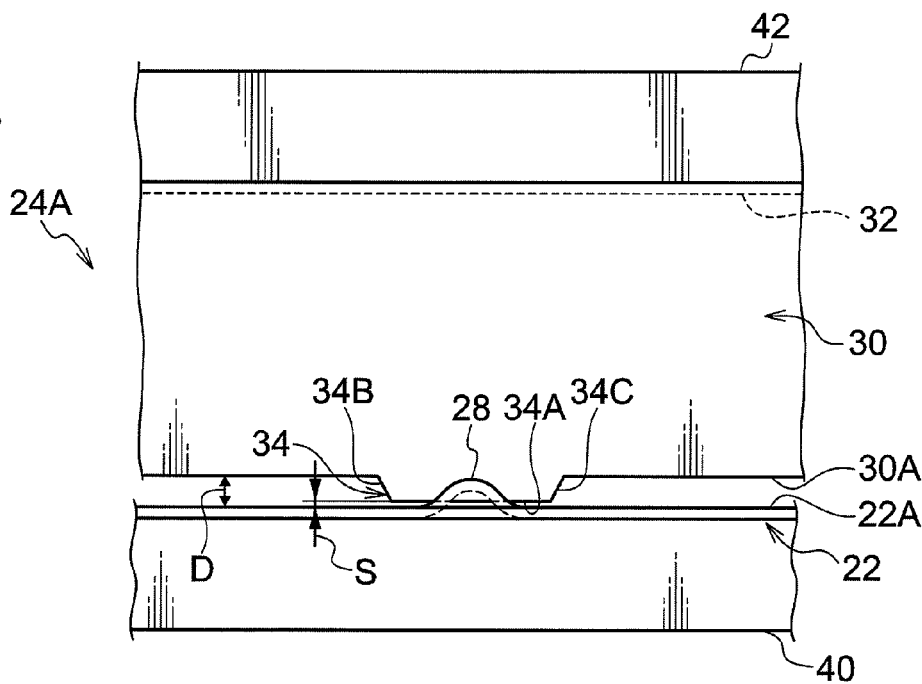
Figure 5:
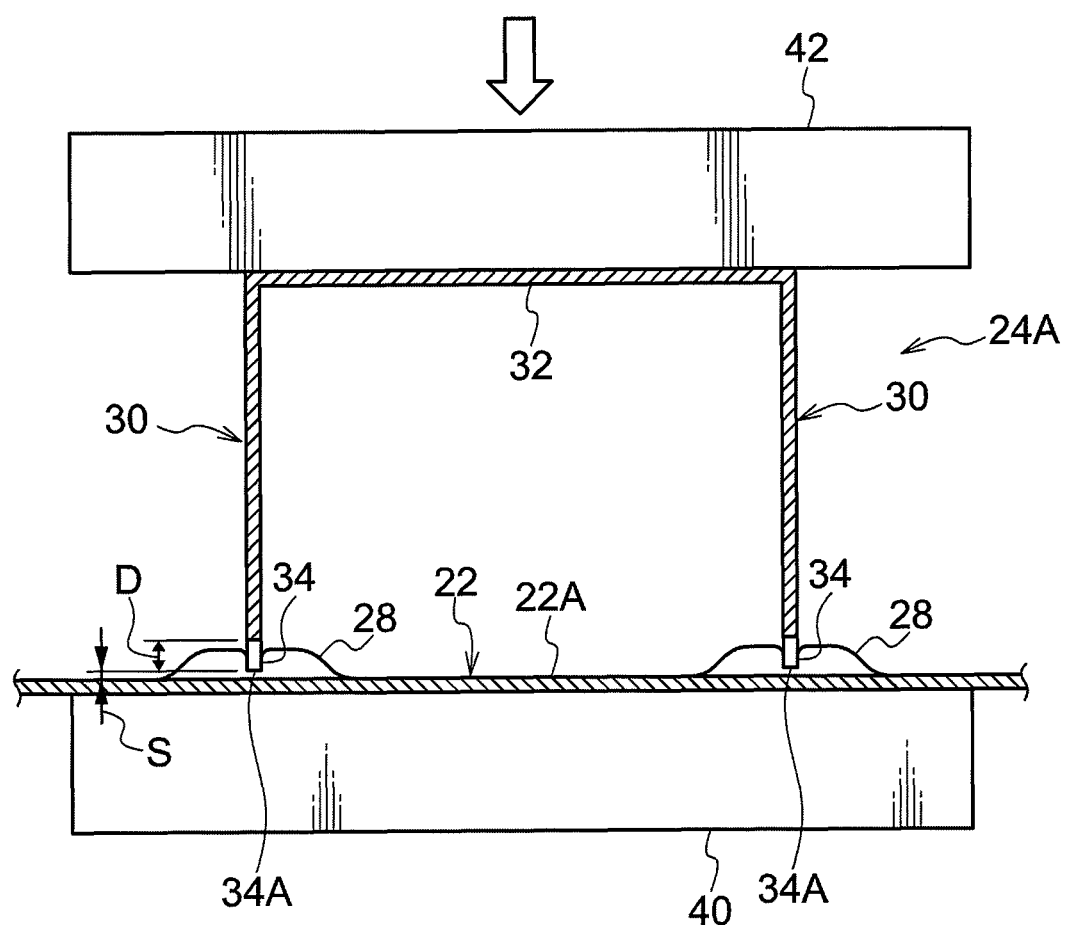
FIG. 5 is an explanatory drawing explaining a projection welding method according to an exemplary embodiment of the present invention, illustrating a cross-section viewed along the length direction of a reinforcement member of an exemplary embodiment of the present invention.

An upper flat plate electrode 42 provided above the reinforcement member 24A is then moved parallel to the reinforcement member 24A downwards by a raising and lowering mechanism, not shown in the drawings, so as to press the reinforcement member 24A, with the projection portions 34 provided to the end faces 30A of the flange portions 30 abutting substantially perpendicularly the welding projections 28 formed to the surface 22A of the panel frame 22. Then, as shown in FIG. 4B and FIG. 5, the upper flat plate electrode 42 is moved downwards by the not-illustrated raising and lowering mechanism until the gap between the surface 22A of the panel frame 22 and the leading end faces 34A of the projection portions 34 reaches a specific gap S, and voltage is applied across the lower flat plate electrode 40 and the upper flat plate electrode 42 while the projection portions 34 are being pressed against the welding projections 28. Electric current thereby flows in the contact portions (welding portions) of the projection portions 34 and the welding projections 28, and the temperature of the welding projections 28 rises due to resistive heating. The welding projections 28 soften as their temperature rises, the softened welding projections 28 are pressed and squashed by the projection portions 34, and the welding projections 28 are welded to the projection portions 34.

Voltage application to the lower flat plate electrode 40 and the upper flat plate electrode 42 is then stopped, and the upper flat plate electrode 42 is moved upwards by the not-illustrated raising and lowering mechanism, and the welding projections 28 cool and harden. Each of the projection portions 34 is thereby welded to the plural welding projections 28 at the same time or in parallel in a state in which the separation D is open between the end faces 30A of the flange portions 30 of the reinforcement member 24A and the surface 22A of the panel frame 22.

Explanation follows regarding operation of the projection welding structure according to the present exemplary embodiment.

In the present exemplary embodiment, as described above, the projection portions 34 are provided to the end faces 30A of the flange portions 30 of the reinforcement member 24A. The separation D is secured between the surface 22A of the panel frame 22 and the end faces 30A of the flange portions 30 corresponding to the height $H_t$ of the projection portions 34 by employing the projection portions 34 as a weld overlap (weld margin). Contact between the surface 22A of the panel frame 22 and the end faces 30A of the flange portions 30 is suppressed since, for example, unevenness or distortion due to manufacturing tolerance, such as on the surface 22A of the panel frame 22, the end faces 30A, or the support faces of the lower flat plate electrode 40 and the upper flat plate electrode 42, is accommodated by the separation D. A specific amount of current thereby flows in the contact portions of the welding projections 28 and the projection portions 34 since current is suppressed from splitting at locations other than the contact portions (welding portions) of the projection portions 34 and the welding projections 28. The weld quality is consequently raised due the contact portions between the welding projections 28 and the projection portions 34 being heated to a specific temperature.

The precision required for the flatness of the surface 22A and the panel frame 22 and the end faces 30A of the flange portions 30 is relaxed due to use of the projection portions 34 to secure the separation D between the surface 22A of the panel frame 22 and the end faces 30A of the flange portions 30. A saving in manufacturing cost can hence be achieved for the panel frame 22 and the flange portions 30 of the reinforcement member 24A. A reduction in manufacturing cost can also be achieved for such a welding apparatus since the flatness precision, such as for the support faces of the lower flat plate electrode 40 and the upper flat plate electrode 42 is relaxed, and the movement precision of the raising and lowering mechanism (not shown in the drawings) for parallel movement of the lower flat plate electrode 40 is relaxed.

In the present exemplary embodiment, the projection portions 34 are also welded to the welding projections 28 in a state in which the gap S is present between the surface 22A of the panel frame 22 and the leading end faces 34A of the projection portions 34. Any tolerance (variation) in the height $H_t$ between the respective plural projection portions 34, and/or unevenness or distortion of the leading end faces 34A of the projection portions 34 is accordingly accommodated by the gap S. The cost of manufacturing the projection portions 34 can accordingly be reduced since the height precision required for the projection portions 34 is relaxed and the flatness precision required for the leading end faces 34A is relaxed.

As shown in FIG. 4A, by making the width $W_t$ of the projection portions 34 wider than the width $W_y$ of the welding projections 28 when viewed along the flange portions 30 plate thickness direction (the seat width direction), positional misalignment in the projection portions 34 width direction can be accommodated when the projection portions 34 are being positioned with respect to the welding projections 28. As shown in FIG. 3, the welding projections 28 also extend along a direction intersecting with the flange portions 30, and so positional misalignment in the welding projections 28 length direction can be accommodated when the projection portions 34 are being positioned with respect to the welding projections 28. A saving in manufacturing cost can accordingly be achieved since the precision required for positioning the projection portions 34 with respect to the welding projections 28 is relaxed.

The angles θ (see FIG. 4A) formed between the sloping faces 34B, 34C of the projection portions 34 and the end faces 30A of the flange portions 30 are also obtuse angles. As described above, during projection welding in the present exemplary embodiment, current flows through the contact portions of the welding projections 28 and the projection portions 34 while the projection portions 34 are being pressed against the welding projections 28. If the projection portions 34 distort or buckle due to the pressing force when this is being carried out, there is a possibility that the flange portions 30 tilt relative to the panel frame 22, leading to the surface 22A of the panel frame 22 and the end faces 30A of the flange portions 30 making contact at locations other than at the contact portions between the welding projections 28 and the projection portions 34. If such contact occurs between the surface 22A of the panel frame 22 and the end faces 30A of the flange portions 30, then the current splits, as mentioned above, with this being a cause of poor welding. In particular, in the present exemplary embodiment the projection portions 34 are welded to the plural welding projections 28 at the same time or in parallel. In such cases, if the flange portions 30 are tilted relative to the panel frame 22, then a difference in timing occurs in when the projection portions 34 contact the respective welding projections 28 according to the position of the respective welding projections 28, or a variation in the current amount passing through the respective plural welding projections 28 occurs as a result of a large difference in timing, causing poor welding.

However, as a countermeasure thereto, in the present exemplary embodiment the angles θ between the sloping faces 34B, 34C of the projection portions 34 and the end faces 30A of the flange portions 30 are set as obtuse angles. The rigidity of the projection portions 34 to the pressing force described above is accordingly raised in comparison to cases in which the angles θ between the sloping faces 34B, 34C of the projection portions 34 and the end faces 30A of the flange portions 30 are right angles or acute angles. The weld quality is accordingly raised due to distortion or buckling of the projection portions 34 being suppressed.

As explained above, according to the projection welding structure of the present exemplary embodiment, the surface 22A of the panel frame 22 and the end faces 30A of the flange portions 30 can be suppressed from making contact at locations other than at the contact portions between the welding projections 28 and the projection portions 34. A reduction in manufacturing cost of the rear seat back 14 can accordingly be achieved while still maintaining weld quality.

Figure 6:
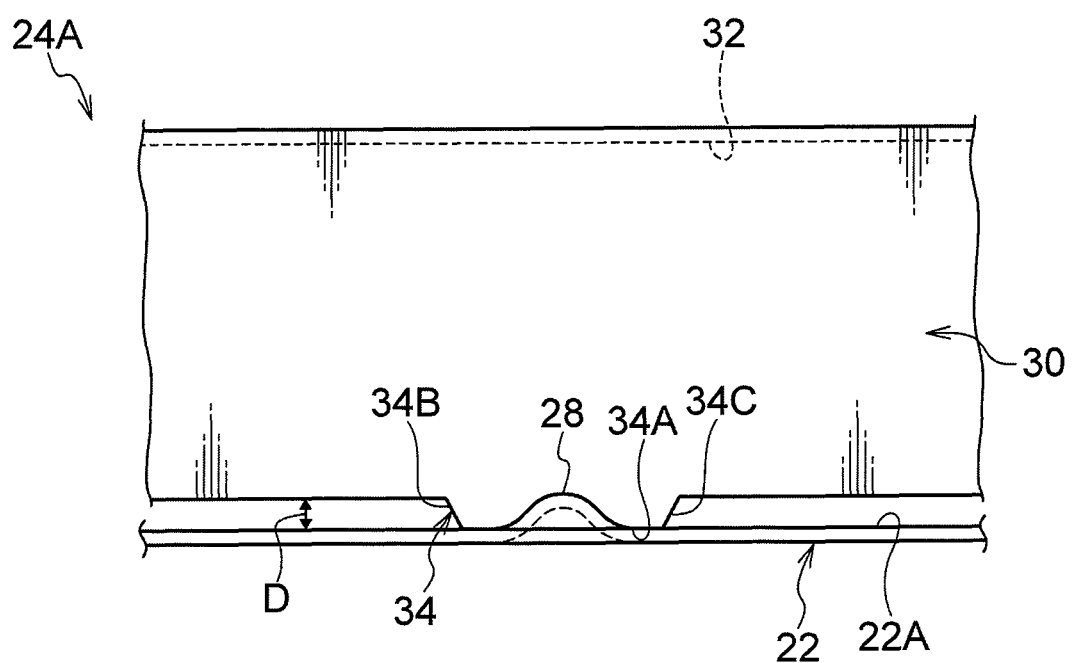
FIG. 6 is a drawing illustrating a modified example of a projection welding structure according to an exemplary embodiment of the present invention, in a side view corresponding to FIG. 4B.

In the present exemplary embodiment, the projection portions 34 are welded to the welding projections 28 in a state in which the gap S is present between the surface 22A of the panel frame 22 and the leading end faces 34A of the projection portions 34. However, as shown in FIG. 6, configuration may be made such that the projection portions 34 are welded to the welding projections 28 in a state in which the leading end faces 34A of the projection portions 34 are placed in contact with the surface 22A of the panel frame 22. Namely, the projection portions 34 may be employed not only as a weld overlap (weld margin) but also as a spacer (stopper) for securing the separation D between the surface 22A of the panel frame 22 and the end faces 30A of the flange portions 30. A reduction in manufacturing cost can accordingly be achieved due to control (regulation) of the gap S between the surface 22A of the panel frame 22 and the leading end faces 34A of the projection portions 34 no longer being required.

In the above exemplary embodiment the shape of the projection portions 34 is a substantially trapezoidal shape as viewed along the flange portions 30 plate thickness direction, however a square shape, rectangular shape or segment shape (fan shape) may be employed for the shape of the projection portions 34, as viewed along the flange portions 30 plate thickness direction. The shape of the welding projections 28 is also not limited to a substantially oblong shape as viewed along the panel frame 22 plate thickness direction (the seat front-rear direction), and configuration may be made with a circular shape, as viewed along the panel frame 22 plate thickness direction (the seat front-rear direction). The number and placement of the welding projections 28 and the projection portions 34 may also be changed as appropriate.

While in the above exemplary embodiment an example has been explained in which the flat plate shaped panel frame 22 serves as the first plate member, the first plate member may be any plate member provided with a surface (flat face) on which it is possible to form welding projections, and a cross-sectional profile of for example a C-shape or L-shape may be employed. Furthermore, while an example has been explained in which the flange portions 30 of the reinforcement member 24A serve as second plate members, the second plate member may be any plate member provided with an end face to abut the welding projections of the first plate member. Note that although the second plate member is not necessarily substantially perpendicular to the surface of the first plate member, the second plate member is preferably substantially perpendicular to the surface of the first plate member in consideration of the efficiency for pressing force transmission between the first plate member and the second plate member during welding. The definition of the second plate member of the present exemplary embodiment also includes a plate member configuring a portion of the reinforcement member 24A, such as the flange portions 30.

In the above exemplary embodiment an example of a projection welding structure of the panel frame 22 and the reinforcement member 24A for configuring the rear seat back frame 18 has been explained. However, the projection welding structure according to the above exemplary embodiment is applicable to various plate members capable of projection welding, and is applicable, for example, to a vehicle door frame, a cabinet frame for electrical equipment, or a construction member.

Whereas the present invention has been explained by way of an exemplary embodiment the present invention is not limited by such an exemplary embodiment. Obviously any appropriate combinations may be made of the above exemplary embodiment and the various examples of modifications, and various embodiments may be implemented within a range not departing from the spirit of the present invention.

What is claimed is:

1. A projection welding structure comprising:
  a first plate member with a plurality of welding projections formed on a surface of the first plate member;
  a second plate member disposed with an end face of the second plate member facing the surface of the first plate member; and
  a plurality of projection portions provided at locations on the end face of the second plate member facing towards the respective welding projections, projecting out from the end face and abutting and welded to the welding projections,
  wherein the plurality of welding projections soften as their temperature rises during welding so that the softened plurality of welding projections are pressed and squashed by the respective projection portions, thereby the plurality of welding projections are welded to the respective projection portions.

2. The projection welding structure of claim 1 wherein, as viewed along the second plate member plate thickness direction, the width of leading end faces of the projection portions is wider than the width of the welding projections.

3. The projection welding structure of claim 1 wherein, as viewed along the second plate member plate thickness direction, angles formed between side edges of the projection portions and the end face of the second plate member are obtuse angles.

4. The projection welding structure of claim 1, wherein, as viewed along the second plate member plate thickness direction, each of the projection portions is formed with a substantially trapezoidal shape projecting out as a protrusion from the end face of the second plate member.

5. The projection welding structure of claim 1, wherein the welding projections extend in a direction intersecting with the length direction of the second plate member, and the projection portions are welded to a length direction intermediate portion of the welding projections.

6. The projection welding structure of claim 1, wherein the first plate member is a panel frame configuring a vehicle seat back.

* * * * *

UNITED STATES PATENT AND TRADEMARK OFFICE
CERTIFICATE OF CORRECTION

PATENT NO.        : 8,999,515 B2
APPLICATION NO.   : 13/449648
DATED             : April 7, 2015
INVENTOR(S)       : Shinichi Horibata It is certified that error appears in the above-identified patent and that said Letters Patent is hereby corrected as shown below:

On The Title Page,

Page 1, Item (54), Line 1, change "PROTECTION WELDING STRUCTURE" to --PROJECTION WELDING STRUCTURE--.

In The Specification,

At Column 1, Line 1, change "PROTECTION WELDING STRUCTURE" to --PROJECTION WELDING STRUCTURE--.

Signed and Sealed this
Third Day of May, 2016

Michelle K. Lee
*Director of the United States Patent and Trademark Office*